United States Patent [19]

O'Connell et al.

[11] Patent Number: 4,663,054

[45] Date of Patent: May 5, 1987

[54] HOT PROCESS LIQUID TREATMENT METHOD AND APPARATUS

[75] Inventors: Robert T. O'Connell, Middletown; Martin Arywitz, Edison, both of N.J.

[73] Assignee: The Graver Company

[21] Appl. No.: 903,555

[22] Filed: Sep. 4, 1986

[51] Int. Cl.⁴ .............................................. C02F 1/58
[52] U.S. Cl. .................................. 210/713; 210/737; 210/197; 210/207
[58] Field of Search ............................... 210/712–715, 210/723, 724, 737, 738, 177, 187, 197, 207, 209

[56] References Cited

U.S. PATENT DOCUMENTS

| | | | |
|---|---|---|---|
| 2,355,564 | 8/1944 | Sebold | 210/713 |
| 2,668,144 | 2/1954 | Joos | 210/713 |
| 3,397,788 | 8/1968 | Duff et al. | 210/195 |
| 3,473,665 | 10/1969 | Duff | 210/207 X |
| 3,583,910 | 6/1971 | Stoddard | 210/713 |
| 3,847,807 | 11/1974 | Herman et al. | 210/713 |
| 3,951,806 | 4/1976 | Young | 210/197 |
| 4,100,071 | 7/1978 | Beurer et al. | 210/197 |
| 4,111,802 | 9/1978 | Louboutin | 210/713 |
| 4,251,371 | 2/1981 | Bauer et al. | 210/197 |
| 4,288,328 | 9/1981 | Montgomery | 210/713 |
| 4,302,328 | 11/1981 | Van Note | 210/714 |
| 4,392,955 | 7/1983 | Soriente | 210/197 X |

OTHER PUBLICATIONS

"Factors in Hot-Process Softener Design and Operation" by V. J. Calise, (Aug. 1950).
"Hot Zeolite Softening" by V. J. Calise, (Sep. 1950).

Primary Examiner—Tom Wyse
Attorney, Agent, or Firm—Dressler, Goldsmith, Shore, Sutker & Milnamow

[57] ABSTRACT

A method and apparatus for treating a liquid in a hot process softener. An eductor tube positioned within a reaction chamber causes liquid from a mixing and recirculation zone to enter the lower end thereof and be continuously recirculated therethrough. Chemicals and recirculated sludge are directed into the eductor tube and are intimately mixed with the liquid therein before exiting therefrom to mix with raw liquid being sprayed into the mixing and recirculation zone.

15 Claims, 1 Drawing Figure

U.S. Patent   May 5, 1987   4,663,054
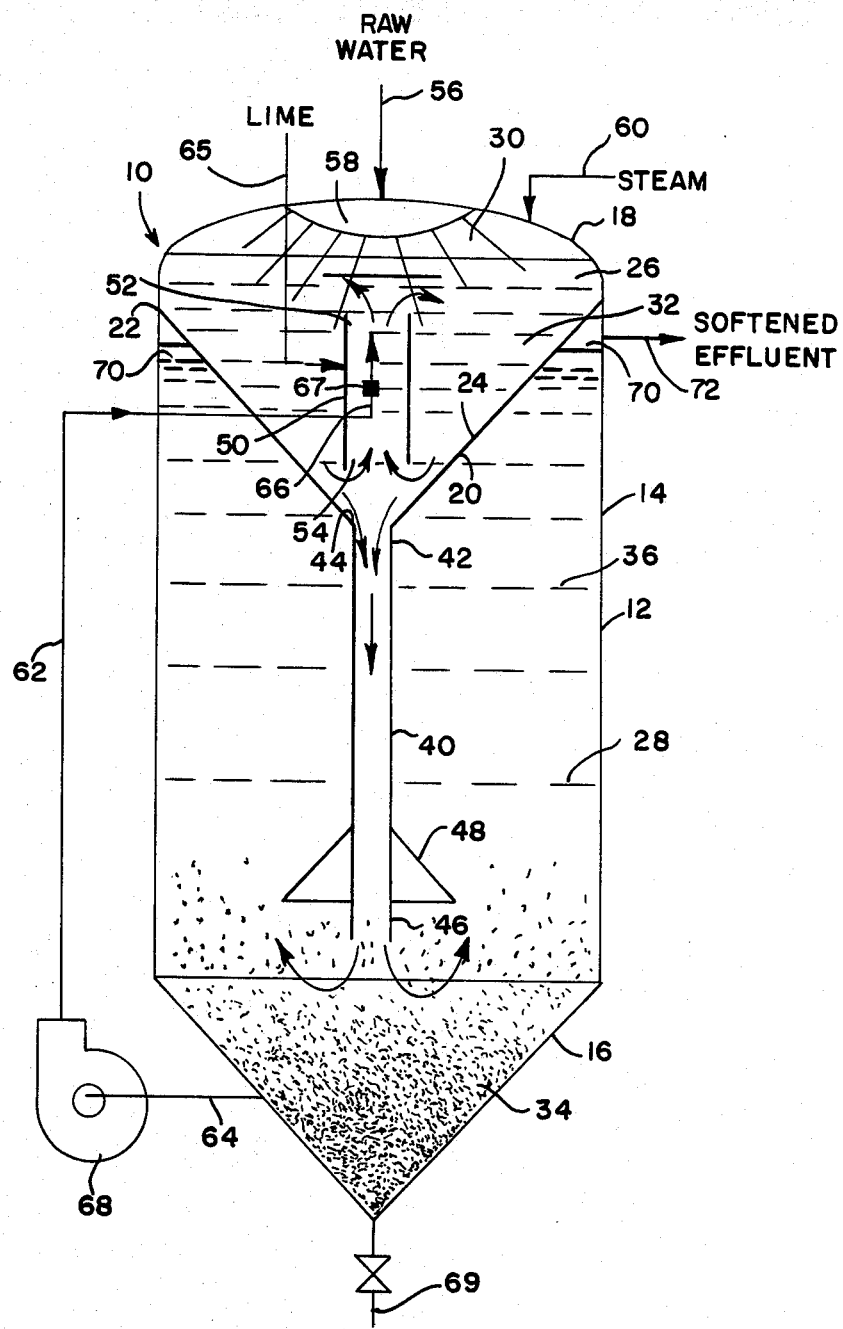

4,663,054

HOT PROCESS LIQUID TREATMENT METHOD AND APPARATUS

FIELD OF THE INVENTION

The present invention is generally directed to a method and apparatus for treating a liquid and more specifically to such an apparatus as is known in the art as a hot process lime softener. Hot process lime softeners are typically utilized to reduce dissolved hardness and silica contained in the liquid to be treated.

BACKGROUND OF THE INVENTION

The hot process softener is a chemical reaction unit for treating a liquid, such as boiler feedwater, with chemicals at an elevated temperature in order to reduce dissolved and suspended impurities to low values. Such units are extremely versatile and are capable of treating raw waters of wide ranges of composition to produce an effluent which meets present-day stringent requirements for minimum concentrations of hardness, silica, oxygen, alkalinity and dissolved solids in a feedwater.

The typical hot process softener unit includes a vessel defining an upper reaction chamber and a lower settling chamber. The liquid to be treated is directed into the reaction chamber wherein its temperature is elevated by steam directed thereinto and it is mixed with chemicals and recirculated sludge, to promote chemical reaction and settling of suspended solid particulates. The liquid mixed in the reaction chamber is directed through a downcomer tube into a separation zone within the settling chamber so as to cause solid particulates to settle into a sludge collection zone and clarified liquid to rise within the separation zone to be withdrawn therefrom as treated liquid.

It is the present practice to merely spray the raw liquid to be treated, chemicals and recirculated sludge into the reaction chamber and rely on residence time to form the mixture which is directed into the settling chamber. As a consequence, hot process softening units have historically operated at flow rates significantly below the theoretically possible flow rates through the settling chamber. Such hot process softening units have not made efficient use of the reaction chamber volume and the settling chamber volume. Further, the efficiency of chemical usage and silica reduction has not been maximized.

Accordingly, there is a need for a hot process softening unit design which makes more efficient use of the reaction chamber volume and thereby permits the unit to operate at a flow rate which more closely approaches the theoretical flow rate of the separation chamber volume. There is also a need for a hot processss softening unit design which improves chemical usage efficiency and silica reduction.

SUMMARY OF THE INVENTION

In general, the hot process softening method and apparatus in accordance with the present invention, continuously recirculates a major portion of the liquid, chemicals and recirculated sludge within a mixing and recirculation zone of the reaction chamber. The liquid, chemicals and recirculated sludge are intimately and efficiently mixed in the reaction chamber. In so doing, the reaction chamber is more efficiently utilized, which permits the unit to operate at higher flow rates and results in more efficient chemical usage and increased silica removal.

More specifically, the hot process softener method and apparatus in accordance with the present invention utilizes an eductor tube positioned within the reaction chamber to cause liquid from a mixing and recirculation zone to enter the lower end thereof and be continuously recirculated therethrough. Fresh chemicals and recirculated sludge are directed into the eductor tube and are intimately mixed with the liquid therein before exiting therefrom to mix with raw liquid being sprayed onto the liquid in the mixing and recirculation zone. A portion of the liquid from the reaction chamber is directed through a downcomer tube into a settling zone wherein solid particulates are caused to settle into a sludge collection zone and clarified liquid is caused to rise in the settling zone. The clarified liquid is withdrawn from the unit through an effluent line in communication with a collecting flume positioned in an upper section of the settling zone.

In accordance with a preferred embodiment of the invention, a partition wall having an inverted conical surface separates the reaction chamber and the settling chamber. The partition wall has a centrally disposed opening therein at the apex of the conical surface which communicates with the upper end of the downcomer tube. The lower end of the eductor tube extends downwardly towards the opening in facing relationship thereto. The flow rate of liquid entering the eductor tube is controlled so as to be equal to or greater than the flow rate of raw liquid entering the unit and greater than the flow rate of liquid entering the downcomer tube.

The invention, both as to its organization and method of operation, will be best understood by reference to the following detailed description taken in conjunction with the accompanying drawing.

BRIEF DESCRIPTION OF THE DRAWING

The FIGURE is a vertical cross-sectional view of a hot process liquid treatment apparatus embodying the features of the present invention.

DESCRIPTION OF PREFERRED EMBODIMENTS

Referring to the FIGURE, there is illustrated a liquid treatment apparatus, generally indicated by reference numeral 10, embodying features of the present invention. The apparatus 10 is of the type well known in the art for softening water by the hot lime softening process to reduce dissolved and suspended impurities to low values. Such units typically utilize chemicals, such as calcium hydroxide, sodium hydroxide, etc., to precipitate dissolved impurities, and recirculate sludge to enhance separation of the solid percipitates. The specific selection of chemicals is dependent upon the impurities in the liquid to be treated as is well known in the art and forms no part of the present invention.

The liquid treatment apparatus 10 comprises a closed vessel 12 having a cylindrical side wall section 14, an inverted, generally conical bottom section 16, and a dished head section 18. Mounted in vessel 12 is an inverted, generally frustro-conical, partition member 20 having upper edges 22 in contact with an upper portion of the side wall section 14. Partition member 20 defines an inverted frustro-conical surface 24 which divides vessel 12 into an upper reaction chamber 26 and a lower settling chamber 28. Reaction chamber 26 includes an upper liquid inlet zone 30 and a lower mixing and recirculation zone 32. Settling chamber 28 includes a lower sludge collection zone 34 and an upper separation zone 36.

A generally cylindrical downcomer tube 40 is centrally mounted within vessel 12. Tube 40 has an open upper end 42, which is in fluid communication with an opening 44 located at the apex of partition member 20, and an open lower end 46, which is in fluid communication with sludge collection zone 34. A frustro-conical shaped baffle 48 may be provided about the lower portion of tube 40 to facilitate distribution of the liquid flow in settling chamber 28.

A generally cylindrical eductor tube 50 is centrally mounted in mixing and recirculation zone 32. Eductor tube 50 has an open upper end 52 in fluid communication with an upper portion of zone 32 and an open lower end 54 in facing relationship to opening 44 and positioned a short distance therefrom.

An inlet line 56 directs liquid to be treated into a suitable distribution header assembly 58 mounted in inlet zone 30, having spray nozzles (not shown), for evenly distributing the liquid within zone 30. A steam inlet line 60 directs steam into zone 30 to heat the liquid to be treated to an optimum temperature in a manner well known in the art.

A sludge recirculation line 62 is provided having a first end portion 64 in fluid communication with sludge collection zone 34 and a second end portion 66 extending into eductor tube 50 having an upwarding extending nozzle 67 associated therewith. A suitable pump means 68 is positioned in line 62 to recirculate a portion of the liquid containing solid particulates from sludge collection zone 34 through line 62 into mixing and recirculation zone 32 via eductor tube 50. A chemical feed line 65 is provided to direct chemicals into mixing and recirculation zone 32 via eductor tube 50. A sludge withdrawal line 69 is provided to periodically withdraw sludge from sludge collection zone 34.

A collecting flume 70 is provided in an upper portion of separation zone 36 for receipt of clarified liquid thereinto. An effluent line 72 communicates with flume 70 to direct softened effluent from vessel 12.

Although not specifically shown in the FIGURE, suitable control valves are provided to control the flow rate of liquid entering vessel 12 and thereby control the level of liquid in vessel 12 above the upper end 52 of eductor tube 50 and below the distribution header 58, in a well known manner. As will hereinbelow become more apparent in the discussion of the operation of the apparatus 10, maintaining certain relationships between the flow rates through various portions thereof are necessary to optimize the performance of the apparatus.

During operation, the raw or influent liquid enters the apparatus 10 through inlet line 56 into distribution header 58 and is distributed into liquid inlet zone 30. Steam is directed into zone 30 through line 60 and forms a steam blanket which intimately contacts the entering liquid to raise the temperature thereof to a desired level, e.g. 250° F. The flow of liquid entering vessel 12 is controlled in a conventional manner to maintain the liquid level therein above the upper end of eductor tube and below the distribution header 58. The heated liquid enters the mixing and recirculation zone.

A portion of the liquid from a lower portion of mixing and recirculation zone is directed downwardly through downcomer tube 40 into a lower portion of the separation zone 36 of settling chamber 28. The liquid changes directions in separation zone 36 and flows upwardly at a relatively low flow rate to allow heavy precipitates or solid particulates entrained therein to disengage and fall into the sludge collection zone 34. The softened and clarified liquid rises in separation zone 36 and is received in a collecting flume 70, which is designed to evenly collect liquid throughout the vessel 12. The softened effluent is withdrawn from flume 70 through line effluent 72.

In accordance with the present invention, a portion of the liquid containing solid particulates from sludge collection zone 34 is directed through sludge recirculation line 62 by pump means 68 into the mixing and recirculation zone 32 through an upwardly extending nozzle 67 in eductor tube 50. The high pressure and velocity of the flow of recirculated sludge entering eductor tube 50 causes liquid from a lower portion of mixing and recirculation zone 32 to be drawn upwardly into tube 50 through the lower end 54 and out through the upper 52. The liquid flow entering eductor tube 50 is equal to or greater than the flow of raw or influent liquid entering vessel 12. Chemicals selected to facilitate the softening reactions are directed into eductor tube 50.

The liquid, recirculated sludge and chemicals are intimately mixed in eductor tube 50 and exit therefrom and mix with the raw liquid being sprayed down onto the surface of the liquid in the mixing and recirculation zone 32. The mixture spreads through zone 32 as it flows downwardly therethrough, with a portion entering downcomer tube 40 and a majority being drawn upwardly into eductor tube 50 in a manner as discussed hereinabove.

In so doing, the formation of larger sized precipitates is achieved by increasing the residence time of the solid particulates formed in the mixing and recirculation zone 32. This is accomplished by efficient utilization of the volume of the reaction chamber 26 by recirculation of previously formed solid particulates through eductor tube 50. This results in higher throughput rates per unit area, or higher efficiency, of the hot process apparatus 10. Also, silica removal from the liquid is increased by the longer mean residence time of the solid precipitates within the reaction chamber 26. Further, the chemicals are similarly more efficiently utilized in the softening reactions.

Having thus described the present invention in detail, it will be apparent to those skilled in the art that modifications and additions can be made which are within the spirit and scope of the invention.

What is claimed is:

1. A hot process liquid treatment apparatus, comprising:
   (a) a vessel having a partition means dividing said vessel into an upper reaction chamber and a lower settling chamber;
   (b) said settling chamber including a lower sludge collection zone and an upper separation zone;
   (c) said reaction chamber including an upper liquid inlet zone and a lower mixing and recirculation zone;
   (d) an inlet line for directing a liquid to be treated into said liquid inlet zone;
   (e) a steam inlet line for directing steam into said inlet zone to increase the temperature of the liquid in said reaction chamber;
   (f) a chemical feed line for directing chemicals into said mixing and recirculation zone;

(g) a downcomer tube means for directing a portion of the liquid from a lower portion of said mixing and recirculation zone into a lower portion of said settling chamber so as to cause solid particulates to separate from the liquid and settle into said sludge collection zone and clarified liquid to rise towards an upper portion of said separation zone;

(h) a sludge recirculation line for directing a portion of the liquid containing solid particulates from said sludge collection zone into said mixing and recirculation zone;

(i) an eductor tube means positioned in said mixing and recirculating zone for continuously mixing and circulating liquid from a lower portion of said mixing and recirculation zone with chemicals and recirculated solid particulates and directing same into an upper portion of said mixing and recirculating zone; and (j) an effluent line for directing clarified liquid from said upper portion of said separation zone.

2. The invention as defined in claim 1 wherein said chemical feed line directs chemicals directly into said eductor tube means.

3. The invention as defined in claim 2 wherein said sludge recirculation line directs liquid containing solid particulates directly into said eductor tube means.

4. The invention as defined in claim 3 wherein the liquid containing solid particulates directed into said eductor tube means from said sludge recirculation line is at a sufficient flow rate to cause liquid from a lower section of said mixing and recirculating zone to be hydraulically drawn upwardly through said eductor tube means.

5. The invention as defined in claim 4 wherein the flow rate of liquid directed through said eductor tube means is equal to or greater than the flow rate of liquid to be treated directed through said inlet line.

6. The invention as defined in claim 5 wherein the flow rate of liquid directed into said eductor tube means is greater than the flow rate of liquid directed through said downcomer tube so as to promote mixing of chemicals and recirculated solid particulates within said mixing and recirculation zone.

7. The invention as defined in claim 1 wherein said unit includes spray nozzles associated therewith for spraying liquid to be treated into said inlet zone so as to intimately contact a blanket of steam formed therein.

8. The invention as defined in claim 1 further including a collecting flume positioned in said upper portion of said separation zone for receipt of clarified liquid therein, said effluent line being in fluid communication with said collecting flume.

9. The invention as defined in claim 1 wherein said partition means defines an inverted frustro-conical surface having a centrally disposed opening at the apex thereof which is in fluid communication with an upper end of said downcomer tube.

10. The invention as defined in claim 9 wherein a lower end of said eductor tube means extends downwardly towards said opening in said conical surface.

11. The invention as defined in claim 1 wherein said sludge recirculation line has a pump means associated therewith for pumping liquid containing solid particulates from said sludge collection zone therethrough.

12. A method for treating a liquid in a hot process softener vessel having a partition means dividing the vessel into an upper reaction chamber defining an upper liquid inlet zone and a lower mixing and recirculation zone and a lower settling chamber defining a lower sludge collection zone and an upper separation zone, comprising:

(a) directing liquid to be treated into the liquid inlet zone;

(b) directing steam into the liquid inlet zone to increase the temperature of the liquid therein;

(c) directing the liquid from the liquid inlet zone into the mixing and recirculation zone;

(d) directing chemicals into the mixing and recirculation zone;

(e) directing a portion of the liquid from the mixing and recirculation zone into a lower portion of the settling chamber so as to cause solid particulates to separate from the liquid and settle into the sludge collection zone and clarified liquid to rise towards an upper portion of the separation zone;

(f) recirculating a portion of the liquid containing solid particulates from the sludge collection zone upwardly through an open ended eductor tube positioned in the mixing and recirculation zone at a sufficient velocity so as to cause a portion of the liquid in the mixing and recirculation zone to flow upwardly through the eductor tube in mixing relationship with the chemicals and recirculated solid particulates into an upper portion of the mixing and recirculation zone;

(g) withdrawing clarified liquid from an upper portion of the separation zone.

13. The method as defined in claim 12 wherein the chemicals are directed directly into the eductor tube.

14. The method as defined in claim 12 wherein the flow rate of liquid directed through the eductor tube is equal to or greater than the flow rate of liquid to be treated directed into the liquid inlet zone.

15. The method as defined in claim 12 wherein the flow rate of liquid directed into the eductor tube is greater than the flow rate of liquid directed into the settling chamber.

* * * * *